US 8,276,084 B2

(12) United States Patent
Castelli et al.

(10) Patent No.: US 8,276,084 B2
(45) Date of Patent: Sep. 25, 2012

(54) PEER-TO-PEER BASED CONTENT DELIVERY IN A VIRTUAL UNIVERSE

(75) Inventors: Vittorio Castelli, Yorktown Heights, NY (US); Rick A. Hamilton, II, Richmond, VA (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/476,057

(22) Filed: Jun. 1, 2009

(65) Prior Publication Data
US 2010/0306675 A1 Dec. 2, 2010

(51) Int. Cl.
G06F 3/048 (2006.01)
G06F 15/16 (2006.01)
A63F 9/24 (2006.01)

(52) U.S. Cl. .................. 715/757; 463/42; 709/203
(58) Field of Classification Search .......... 715/757, 715/744, 758; 463/42; 709/203; 370/254–258, 370/351
See application file for complete search history.

(56) References Cited

U.S. PATENT DOCUMENTS

| 7,073,129 | B1 | 7/2006 | Robarts et al. | |
| 7,373,377 | B2 | 5/2008 | Altieri | |
| 8,043,159 | B2 * | 10/2011 | Bae et al. | 463/42 |
| 2006/0258462 | A1 * | 11/2006 | Cheng et al. | 463/42 |
| 2006/0288119 | A1 * | 12/2006 | Kim et al. | 709/238 |
| 2007/0054716 | A1 * | 3/2007 | Hiruta | 463/1 |
| 2007/0184902 | A1 * | 8/2007 | Liu et al. | 463/42 |
| 2007/0293319 | A1 * | 12/2007 | Stamper et al. | 463/42 |
| 2008/0070688 | A1 * | 3/2008 | Loehrer | 463/42 |
| 2008/0098064 | A1 | 4/2008 | Sherinian | |
| 2008/0115121 | A1 * | 5/2008 | Douceur et al. | 717/168 |
| 2008/0235391 | A1 * | 9/2008 | Painter et al. | 709/232 |
| 2009/0235183 | A1 * | 9/2009 | Hamilton et al. | 715/757 |
| 2009/0265458 | A1 * | 10/2009 | Baker et al. | 709/224 |
| 2009/0325712 | A1 * | 12/2009 | Rance | 463/42 |

FOREIGN PATENT DOCUMENTS

WO    WO 2008/040092 A1 * 10/2008

OTHER PUBLICATIONS

Marvie, J-E et al., "A VrmL97-X3D Extension for Massive Scenery Management in Virtual Worlds," IEEE/ACM Digital Library 2004, pp. 145-153, 188.
Hadjiefthymiades, S. et al., "Using Proxy Cache Relocation to Accelerate Web Browsing in Wireless/Mobile Communications," ACM Digital Library, WWW10, May 1-5, 2001, Hong Kong, pp. 26-34.
He, Z. et al., "Path and cache conscious prefetching (PCCP)," ACM Digital Library, the VLDB Journal (2007), pp. 236-249.

* cited by examiner

*Primary Examiner* — Kieu Vu
*Assistant Examiner* — James T Durkin
(74) *Attorney, Agent, or Firm* — William E. Schlesser; Ronald A. D'Alessandro; Keohane & D'Alessandro PLLC

(57) ABSTRACT

The present invention permits performance adjustment in a virtual universe. In particular, the invention proposes a mixed server-based/peer-to-peer approach, in which transmission responsibilities are shifted towards peer-to-peer computing as the number of avatars within a region increases. The invention may foster fluid business transactions (e.g., sales) during times of high avatar load.

23 Claims, 8 Drawing Sheets

PEER-TO-PEER BASED CONTENT DELIVERY IN A VIRTUAL UNIVERSE

FIELD OF THE INVENTION

The present invention relates to content delivery in a Virtual Universe (VU). Specifically, the present invention relates to content delivery in a VU through server-based and peer-to-peer approaches.

BACKGROUND OF THE INVENTION

Substantial performance degradation may occur when large numbers of avatars gather in a single region. Such performance degradation may have negative fiscal and reputation impacts when corporations create areas to showcase products and services and to host virtual meetings with customers or seminars with a large attendance. A root cause of the performance degradation is the inherent server-centric nature of traditional virtual universe software. The server is required to transmit and receive copious amounts of data to describe the region, including the avatars, region textures, etc. In traditional virtual universe systems, the virtual universe server transmits textures, avatar geometries, etc., to each user. Such a system has low inherent scalability as each new avatar within a region requires the server to re-transmit the geometries, textures, etc., to the new avatar.

SUMMARY OF THE INVENTION

The present invention permits performance adjustment in a virtual universe. In particular, the invention proposes a mixed server-based/peer-to-peer approach, in which transmission responsibilities are shifted towards peer-to-peer computing as the number of avatars within a region increases. The invention may foster fluid business transactions (e.g., sales) during times of high avatar load.

A first aspect of the present invention provides a method for content delivery in a region of a virtual universe (VU), comprising: examining a capacity of the region of the VU to determine whether the capacity exceeds a predetermined threshold; forming a set of subgroups of avatars in the region if the predetermined threshold is exceeded; and transmitting VU data between the avatars of a particular one of the set of subgroups using a peer-to-peer broadcast.

A second aspect of the present invention provides a system for content delivery in a region of a virtual universe (VU), comprising: a module for examining a capacity of the region of the VU to determine whether the capacity exceeds a predetermined threshold; a module for forming a set of subgroups of avatars in the region if the predetermined threshold is exceeded; and a module for transmitting VU data between the avatars of a particular one of the set of subgroups using a peer-to-peer broadcast.

A third aspect of the present invention provides a program product stored on a computer readable medium for content delivery in a region of a virtual universe (VU), the computer readable medium containing program code for causing a computer to: examine a capacity of the region of the VU to determine whether the capacity exceeds a predetermined threshold; form a set of subgroups of avatars in the region if the predetermined threshold is exceeded; and transmit VU data between the avatars of a particular one of the set of subgroups using a peer-to-peer broadcast.

A fourth aspect of the present invention provides a method for content delivery in a region of a virtual universe (VU), comprising: providing a computer infrastructure being operable to: examine a capacity of the region of the VU to determine whether the capacity exceeds a predetermined threshold; form a set of subgroups of avatars in the region if the predetermined threshold is exceeded; and transmit VU data between the avatars of a particular one of the set of subgroups using a peer-to-peer broadcast.

A fifth aspect of the present invention provides a data processing system for content delivery in a region of a virtual universe (VU), comprising: a memory medium comprising instructions; a bus coupled to the memory medium; and a processor coupled to the bus that when executing the instructions causes the data processing system to: examine a capacity of the region of the VU to determine whether the capacity exceeds a predetermined threshold; form a set of subgroups of avatars in the region if the predetermined threshold is exceeded; and transmit VU data between the avatars of a particular one of the set of subgroups using a peer-to-peer broadcast.

BRIEF DESCRIPTION OF THE DRAWINGS

These and other features of this invention will be more readily understood from the following detailed description of the various aspects of the invention taken in conjunction with the accompanying drawings in which.

Figure 1:
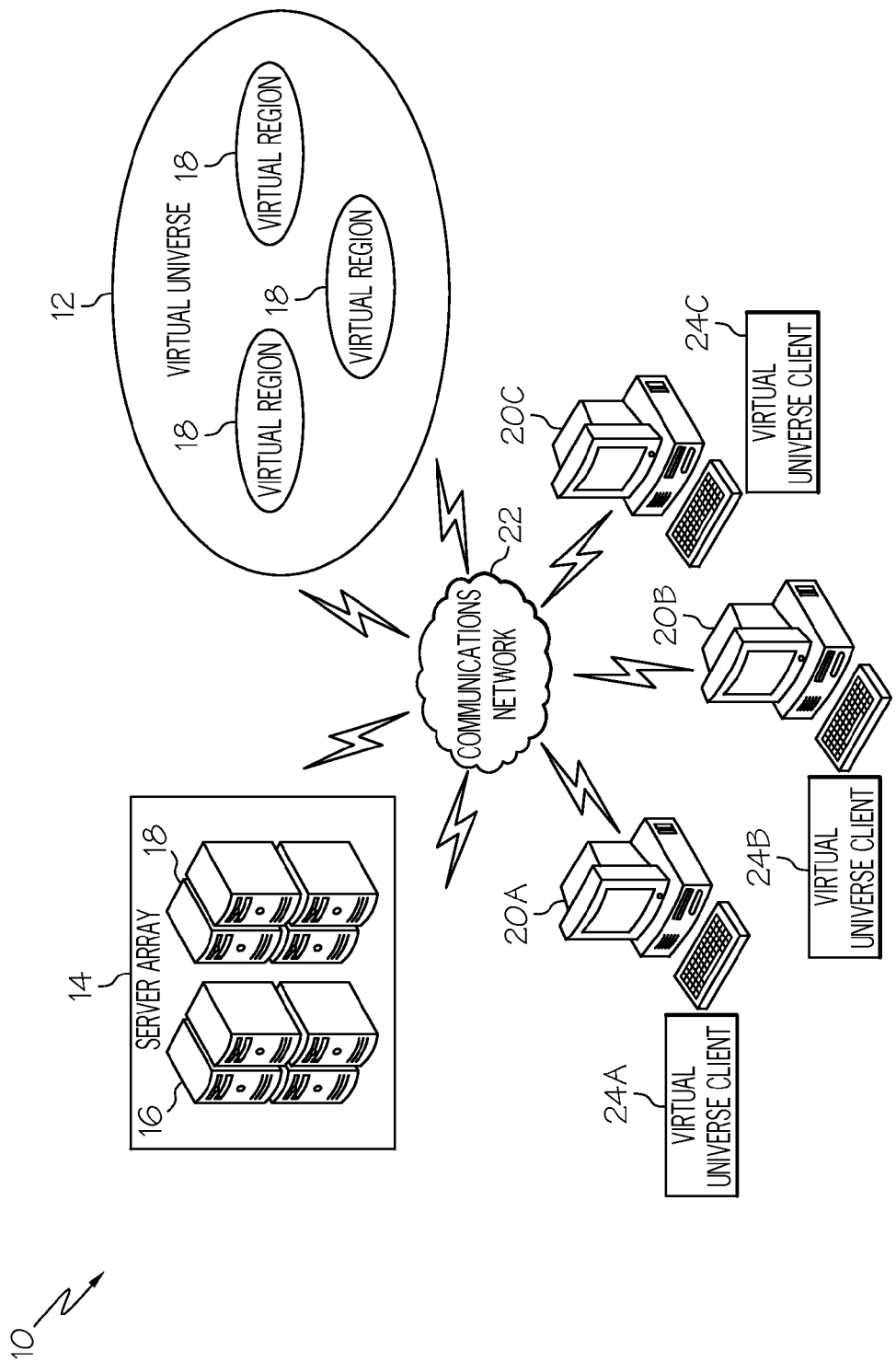
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. VU Concepts Defined
II. General Description
III. Computerized Implementation

I. VU Concepts Defined (1) An avatar is a graphical representation of a user that the user selects that others can see, often taking the form of a cartoon-like human.

(2) A region is a virtual area of land within the VU, typically residing on a single server.

(3) Assets, avatars, the environment, and anything visual includes UUIDs (unique identifiers) tied to geometric data (distributed to users as textual coordinates), textures (distributed to users as graphics files such as JPEG2000 files), and effects data (rendered by the user's client according to the user's preferences and user's device capabilities).

(4) Objects in a virtual universe are composed of one or more primitive objects such as cones, triangles, and polygons. The more detailed an object is (i.e., the more primitive objects it is composed of) the longer the object will take to render and download. It is common for virtual world regions to incorporate many objects in their design.

(5) Cache—A cache is a collection of data duplicating original values stored elsewhere or computed earlier, where the original data is expensive to fetch (due to slow access time) or to compute, relative to the cost of reading the cache. A cache is a temporary storage area where frequently accessed data can be stored for rapid access. Once the data is stored in the cache, future use may access the cached copy rather than re-fetching or re-computing the original data, resulting in a lower average access time.

(6) Rendering—Rendering is the process of producing the pixels of an image from a higher-level description of its components. Additionally, rendering is the process of generating an image from a model by means of computer programs. The model is a description of three dimensional objects in a strictly defined language or data structure. Models contain geometry, information.

(7) Items refer to anything capable of being downloaded, displayed, and/or used in a virtual universe. Examples include, among other things, objects, textures, advertisements, scripts, etc.

II. General Description

The present invention permits performance adjustment in a virtual universe. In particular, the invention proposes a mixed server-based/peer-to-peer approach, in which transmission responsibilities are shifted towards peer-to-peer computing as the number of avatars within a region increases. The invention may foster fluid business transactions (e.g., sales) during times of high avatar load.

Illustrative uses of the present invention include (among others):

(1) The virtual universe server may switch to the hybrid server-based plus peer-to-peer protocol described when load conditions would result in reduced virtual universe response times. The invention permits the virtual universe to avoid deterioration in the behavior of nearby avatars and only exhibit deterioration in the behavior/appearance of avatars that are at a specified distance from the avatar.

(2) Users who remunerate the virtual universe provider may always have server-based avatars that are high-quality (behavior/appearance) both locally and remotely: for example, the host of a customer meeting may want to ensure their avatar is always rendered in high-quality avatar.

(3) In some embodiments, further processing may be off-loaded from the server to the clients: for example, a user moving in the VU may receive high-resolution information on the landscape from other users that are already in the area and that have previously obtained the textures, geometries, etc from the virtual universe server.

FIG. 1 shows a high-level schematic diagram showing a networking environment 10 for providing a virtual universe 12 according to one embodiment of this invention in which monitoring user demographics within the virtual universe can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures, and scripts.

Like the real world, each virtual region 18 within virtual universe 12 comprises a landscape having virtual content, such as buildings, stores, clubs, sporting arenas, parks, beaches, cities, and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustrative purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window display, etc. As will be further described herein, embodiments of this invention are directed to facilitating the management of these advertisements assets in virtual universe 12.

Figure 2:
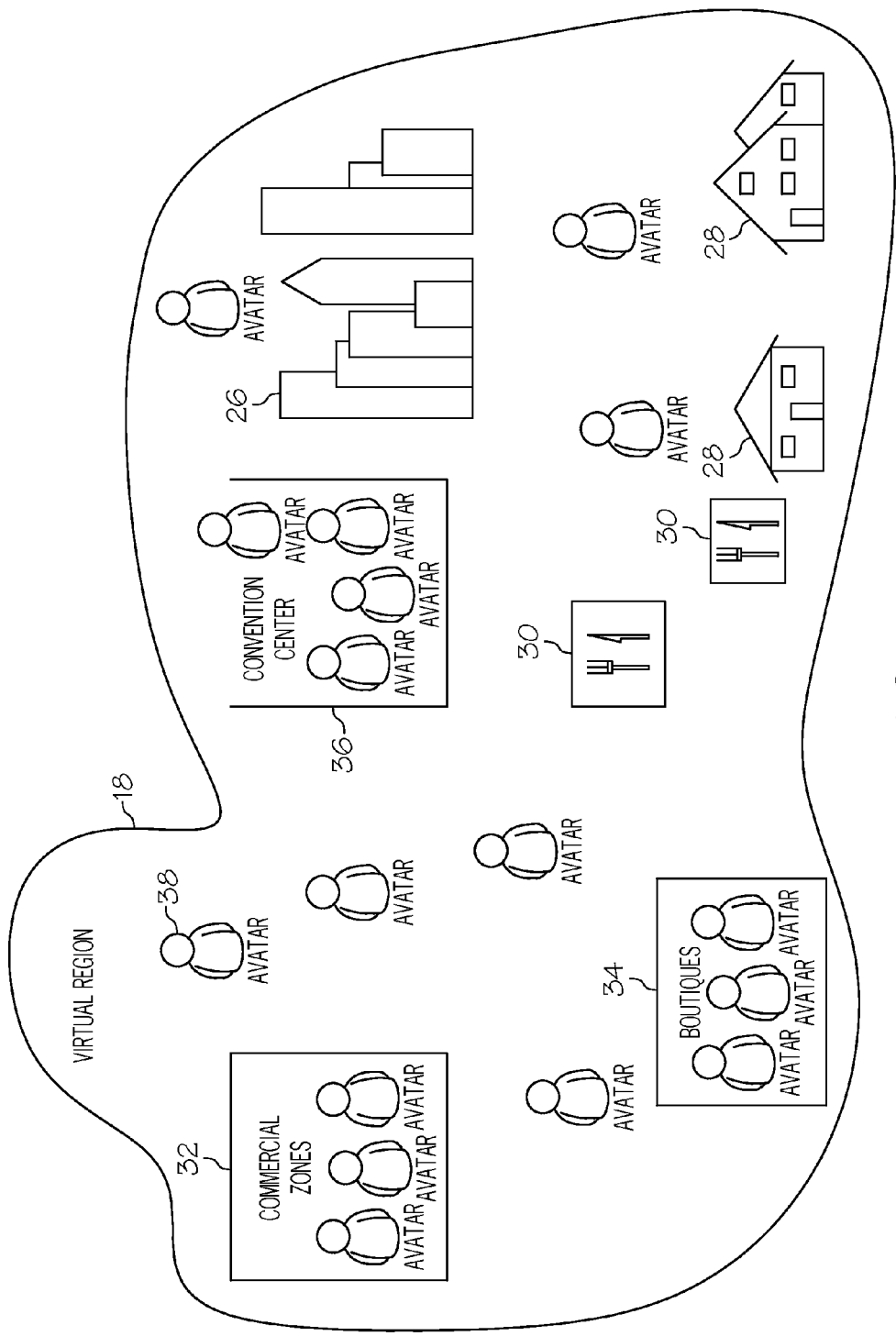
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, who roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have many more items that can be found in the real world universe as well as things that do not presently exist in the real world.

Figure 3:
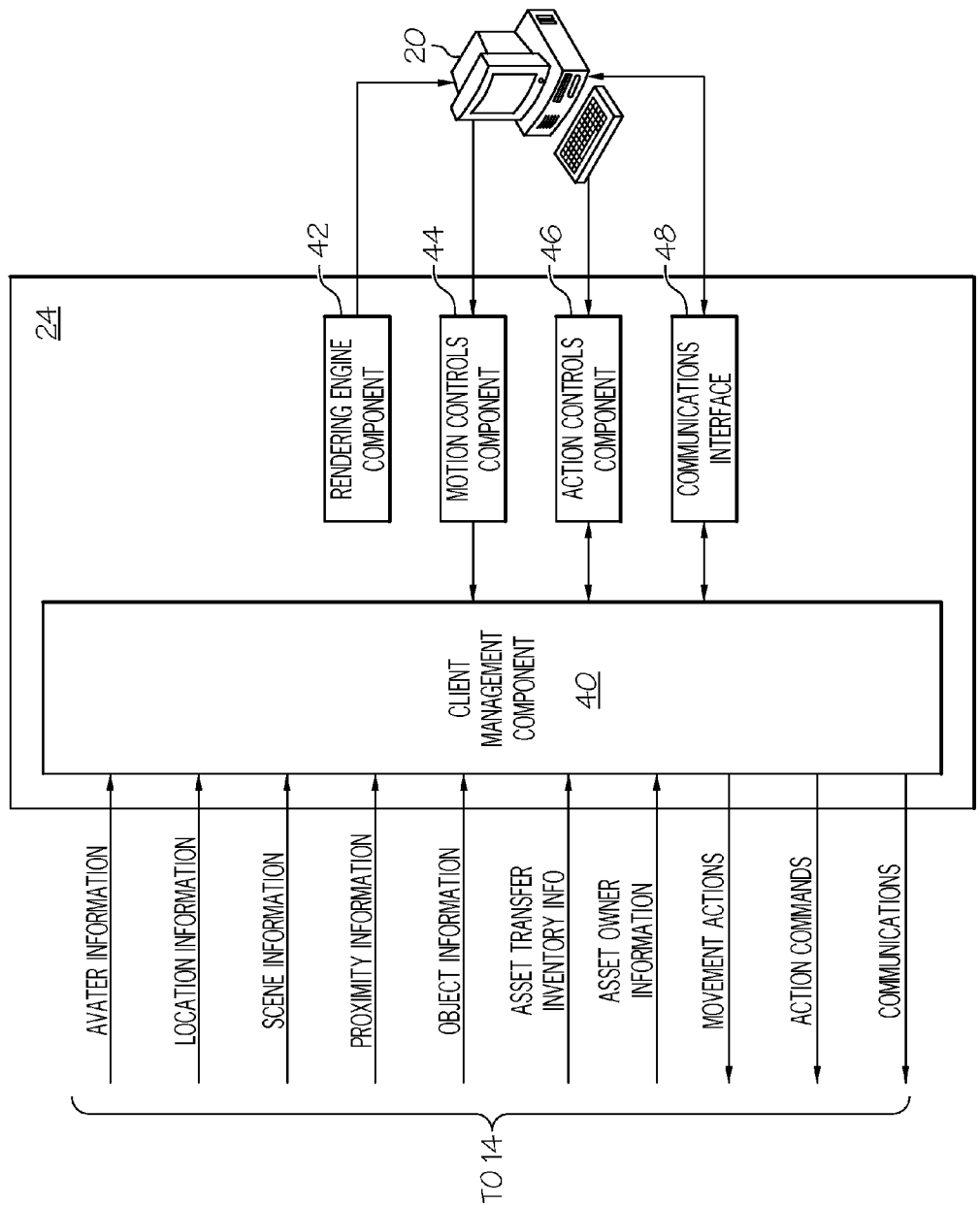
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands, and communications made by a user through computer 20, and information received from the virtual universe through server array 14. A rendering engine component 42 enables the user of computer 20 to visualize his or her avatar within the surroundings of the particular region of virtual universe 12 in which the avatar is presently located. A motion controls component 44 enables the user's avatar(s) to make movements through the virtual universe. In one embodiment, movements through the virtual universe can include, for example, gestures, postures, walking, running, driving, flying, etc. An action controls component 46 and enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking, and electronic mail (e-mail).

Figure 4:
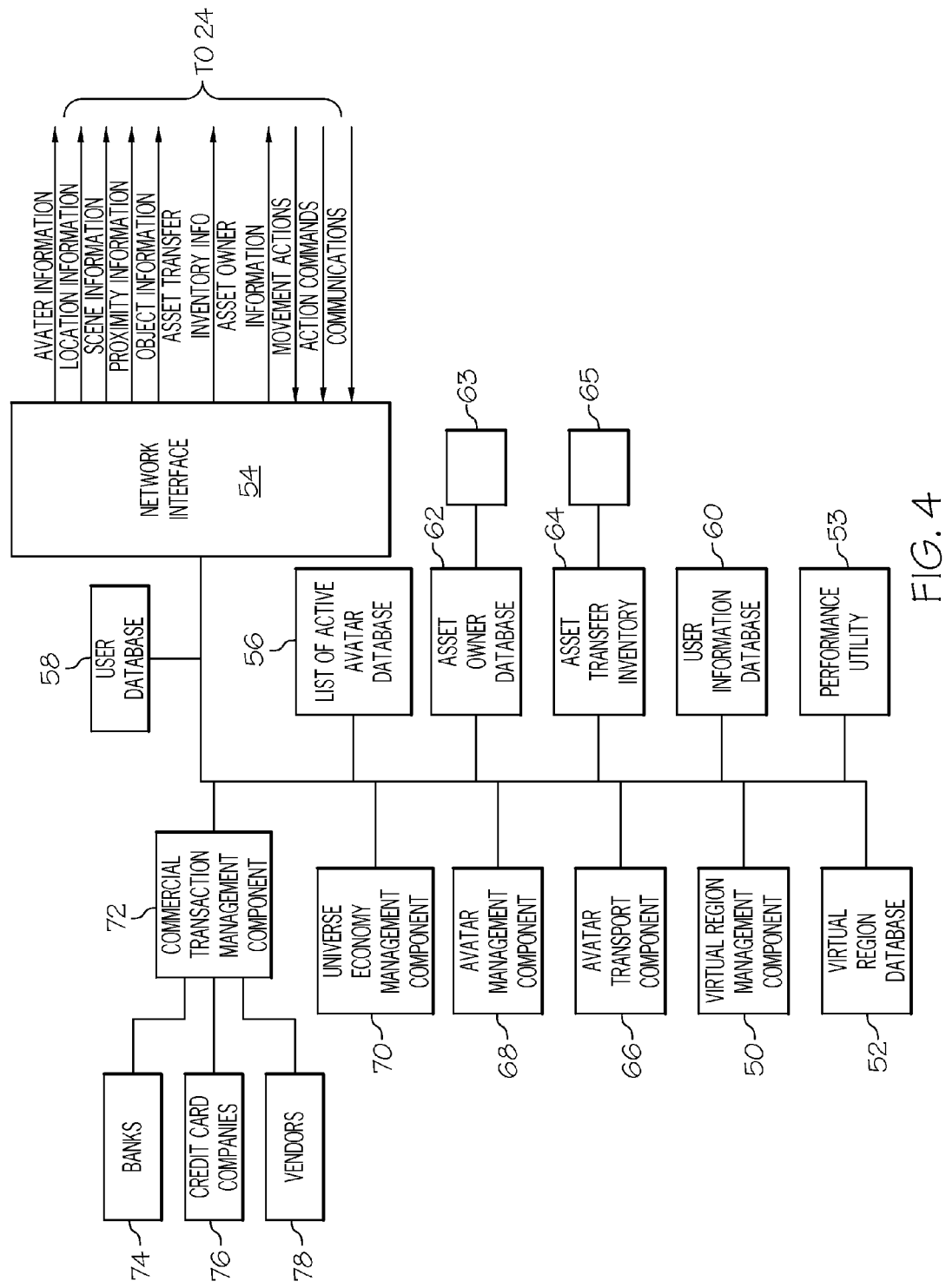
FIG. 4 shows a more detailed view of some of the functionalities provided by the server array shown in FIG. 1.
Figure 5:
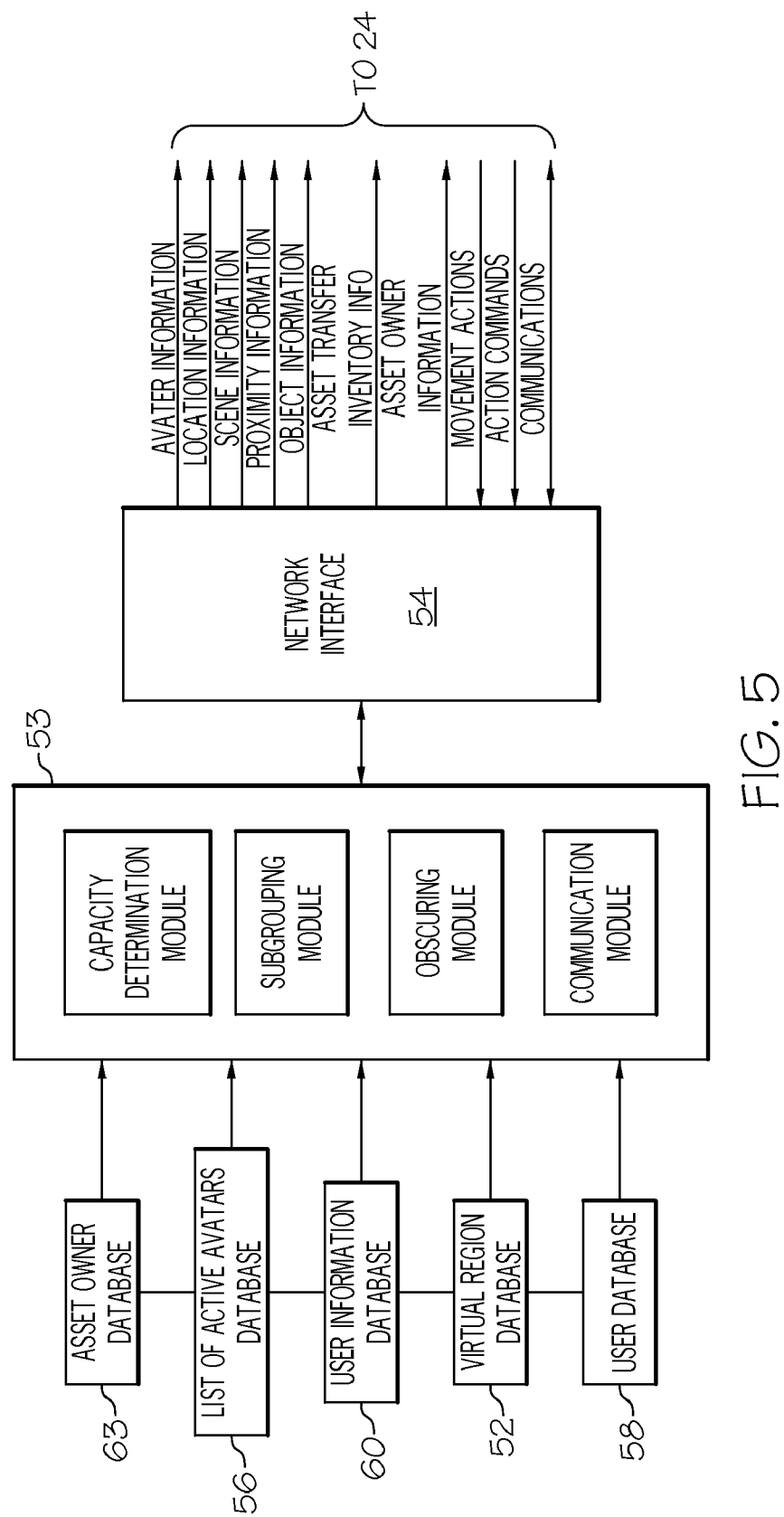
FIG. 5 shows a more detailed diagram of the performance utility of FIG. 4.

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the performance utility 53 (FIGS. 4 and 5). FIG. 3 also shows the movement commands and action commands that are generated by the user and sent to the server array via client management component 40, as well as the communications that can be sent to the users of other avatars within the virtual universe.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows a performance utility 53, which provides functionality of the present invention such as to pre-fetch/cache items based on communications between avatars, as will be further described below. In this embodiment, performance utility 53 resides on the same computer system as server array 14, and communicates directly to virtual universe 12 and its users via virtual universe client 24. In other embodiments, performance 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases for storing information. In particular, virtual region database 52 stores information on all of the specifics in virtual region 18 that virtual region management component 50 is managing. Virtual region database 52 contains metadata information about the objects, texts, and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, locales, interests, ages, preferences, etc., while user information database 60 contains more sensitive information on the users such as billing information (e.g., credit card information) for taking part in transactions.

Databases 52, 56, 58, 60, 62, and 64 contain information on the avatars of the users that reside in virtual universe 12. In one embodiment, virtual region database 52, list of active avatars database 56, user database 58, user information database 60, and asset owner database 62 are tracked for avatars within a multidimensional space of the virtual region 18. The information is typically in the form of metadata associated with the virtual content of each user's avatar(s). An illustrative but non-limiting list of avatar usage information includes appearance, asset inventory, past activities, and purchases. Those skilled in the art will recognize that this listing of avatar usage information is illustrative of possible items and is not exhaustive. For example, other user information may include name of the owner, e-mail address of the owner, address of the originating computer, or any other type of user information.

Each item may be associated with a piece of executable code or other data called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60, and asset owner database 62 are databases that contain item information within performance utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60 and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60, and asset owner database 62 might reside on the same computers as virtual universe client 24, and have components that reside on both server array 14 and virtual universe client 24, or reside on separate computers in direct communication with virtual universe servers 16 and virtual universe client 24.

An avatar transport component 66 enables users, as mentioned above, to transport through space from one point to another point instantaneously. As a result, an avatar could, for example, travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed.

An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real-life money. The users can then take part in commercial transactions for their avatars through universe economy management component 70. For example, an avatar might want to pay for a service that provides discovery and transfer of assets within the virtual universe. In this case, the avatar would make the purchase of this service using the VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76, and vendors 78.

Referring now to FIG. 5, performance utility 53 according to embodiments of the invention will be described in further detail. As shown in FIG. 5, performance utility 53 comprises region capacity detection module 80, subgroup determination module 82, avatar obscuring module 84, and communication module 86.

Initially, capacity detection 80 system will detect the capacity of a region of VU. To accomplish this, peer-to-peer load shedding is first invoked through automatic overload detection on a VU server. In general, VU server load is influenced by a multitude of factors existing within its assigned region of land including but not limited to: number of residents, number and complexity of distinct textures within land region, and streaming media such as music or video. As more residents enter a region of land, the VU server has to expend additional CPU cycles and memory, creating load. For each resident, server CPU resources are required to transmit geometric information, avatar movements, transmit textures to clients, and stream audio and video for the servers region. If the CPU resources required for all residents exceed the available CPU resources on a server, performance for users degrade. Degradation can be detected by determining the "wall time" for certain VU server operations to complete and comparing the elapsed "wall time" for those operations to a previously measured baseline. If performance has degraded below a threshold for a time period the overload detection system engages the peer-to-peer load shedding system.

It should be noted that most regions of land will have a distinct resident threshold that results in degraded performance. The threshold is influenced by textures, geometric information and streaming media uses within the server's assigned land. Of additional interest is that using "wall time" to detect degraded performance has the benefit of detecting server degradation due to processes running external to the VU server software, but on the same server. Such processes include file system indexing process, user terminals, file transfers, etc.

Additionally, It should be noted that some embodiments may store and analyze performance metrics before, during, and after degradation occurs. Such embodiments may be able to preemptively engage the server transfer system upon detection that the server is on the verge of degradation and additional residents are en route to the server's land (through teleportation notification). The server administrator may set thresholds to trigger the avatar server transfer system. Some triggers can include (but are not limited to):

(1) Number of VU users currently active in region
    (2) CPU utilization threshold being met/exceeded
    (3) Memory utilization threshold being met/exceeded If it is determined by capacity detection system 80 that the capacity of the region under analysis exceeds a predetermined threshold (e.g., the capacity is at maximum levels or approaching maximum levels, subgroup determination system 82 will form a set (one or more) of subgroups of avatars. Specifically, subgroup determination system 82 analyzes activity within the VU to detect naturally occurring subgroups within virtual universe regions. Several methods exist to place avatars into subgroups including: avatar interactions and other criteria discussed in the section "Other Methods of Subgroup Determination." The subgroup determination system may be constantly engaged, analyzing VU behavior, to detect the optimal alignment of avatars into subgroups for use by the peer-to-peer load shedding module described below. The VU administrator will be able to set the thresholds and criterion for triggering a subgrouping and subsequent triggering of the peer-to-peer load shedding module. The purpose for grouping avatars is to establish a network of peers with which transmission of textures, geometries, etc. is likely.

Along these lines, if two or more avatars are involved in a chat session, the avatars involved in the chat session may be a candidate for subgrouping. Additionally, other interactions such as waving or handing a virtual document to another avatar should result in those avatars as candidates for subgrouping. Interaction detection for subgroups may also contain a temporal component, such that recent interactions to determine subgroups take precedent over previous interactions. A software module can be implemented on the VU servers to meter activity which constitutes avatar interaction (based on administrator criterion). Other examples of avatar interaction include, but are not limited to: voice chat, membership in companies, membership in families, similar avatar inventories, avatar eye contact, avatar distance, etc.

Other Methods of Subgroup Determination are as follows:

The following enumerates other criteria and mechanisms of dynamic subgroup determination. A subgroup may be formed when avatars that have interacted in the past are within a certain radius of one another. This may require an interaction table that keeps track of previous interactions, for example:

avatar 1: has chatted with avatars 2, 7, and 111 within the last 4 days.
    avatar 2: has bumped into avatar 4
    avatar 3: has 90% shared inventory with avatar 1
    avatar 4: member of corporation A
    avatar 5: member of corporation A
    avatar 6: history of visiting Island C The interaction table above can be written to after certain events occur (e.g., chatting, bumping, sharing, visiting an island, or stating membership of a particular group).

Dynamic subgroup determination may be based on whether an avatar has bumped into another avatar or whether a certain percentage of the inventory has a commonality. For example, if avatar 1 and avatar 3 have 90% of their inventory items related to fractal art, they may form an automatic subgroup. If avatars are members of the same company, corporation, group, political party, demographic, or interest group, they may form a subgroup. If avatar 6 and avatar 5 have a history of visiting a particular region of the VU, they may for a subgroup. If the system detects that avatar 1 is in the middle of a business transaction with avatar 2, a subgroup containing them both may be formed. For example, avatar 1 may be in the middle of making a payment to avatar 2 using a traditionally method for payment determination.

In summary, means for determining subgroups may include self-identified groups, "real world" geographic location, friend or buddy lists, corporate or organizational interactions, shared interests, shared inventory, and recent interactions, among other such mechanisms.

Figure 6:
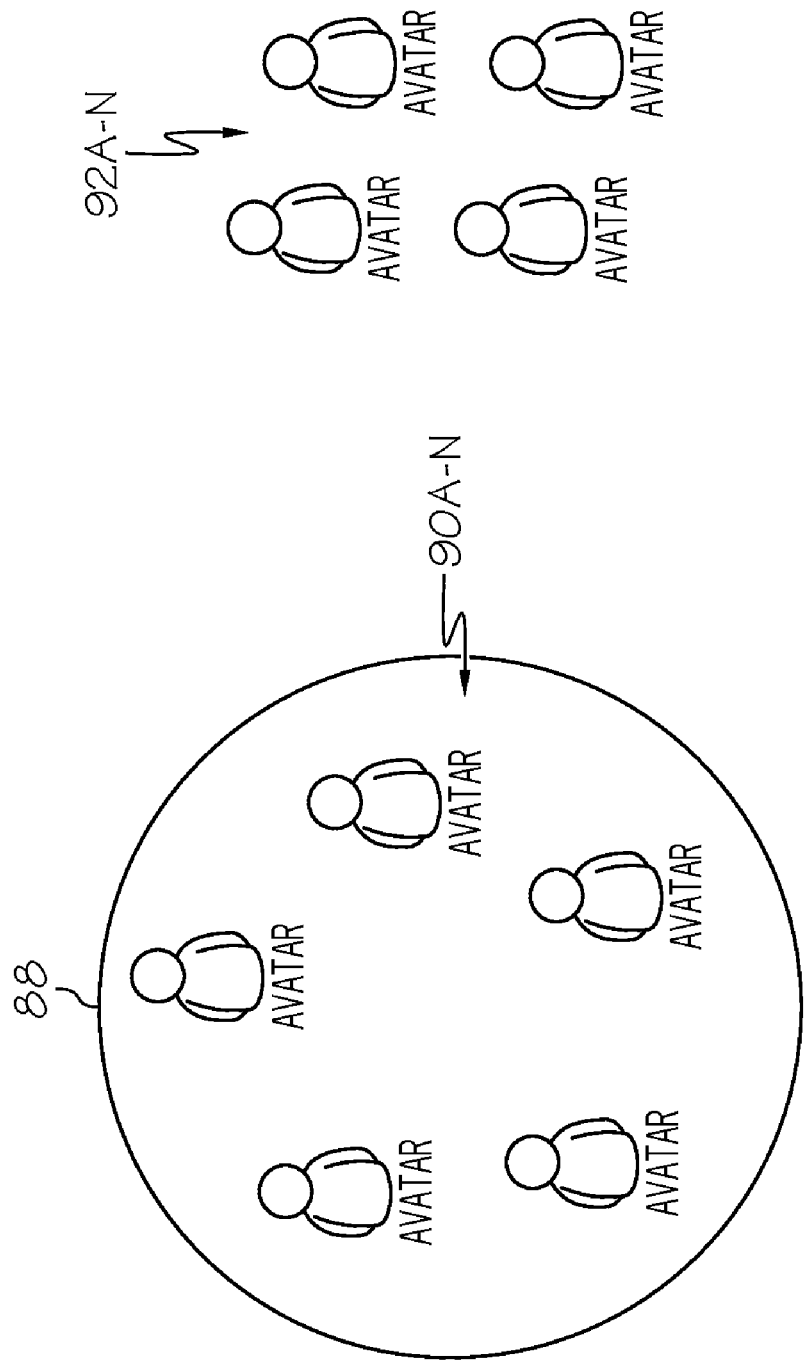
FIG. 6 shows performance adjustment according to one embodiment of the present invention.

Regardless of how the avatars are subgrouped, any avatars that are outside of a particular one subgroup will be obscured in appearance via obscuring module 86 with respect to the avatars in the particular one subgroup. An example of subgrouping and obscuring is shown in FIG. 6. As shown, avatars 90A-N have been grouped together into a single group 88 (via any of the methods described herein. Accordingly, any avatars 92A-N not included in subgroup 88 will be obscured in appearance with respect to avatars 90A-N. This is true for any other subgroups that may be formed (not shown). Although not shown, avatars 92A-N may be grouped into one or more additional subgroups.

Once grouped into a particular subgroup 88, and upon instruction for the region, avatars 90A-N can communicate with one another via communication module 86. The content communicated between avatars 90A-N can be transmit textures and other high bandwidth or computationally intensive data between avatars in the subgroup. As part of the server instructions invoking peer-to-peer transmission, each peer within the group is given a list of peers and associated network routing information to communicate with each peer. Using known peer-to-peer transmission technologies, peers may acquire parts of large objects simultaneously from other peers reconstructing the large object after all parts are acquired. Clients may request objects from peers using broadcast technologies upon instruction from the server. For example, the server may notify a client that an avatar within the subgroup has taken an item out of their inventory which must now be rendered. In other embodiments, clients within a peer group may notify, via broadcasting technologies, which the client has taken an item out of their inventory which must now be rendered. Peer-to-peer transmission may be phased in with standard server transmission methodologies, such that only certain textures or objects are acquired from peers. In one potential embodiment only objects that exceeded a specified size will be acquired using peer-to-peer methods. In some embodiments, avatars not within the current grouping may be rendered with limited detail and limited updates to their location. Such methods may be required if the bandwidth available to download or upload objects for the visible region exceeds that of the users and peer groups capacity.

It is understood that for the purposes of this disclosure, communication between avatars means/includes communications between computers controlling the avatars (e.g., personal computers, servers, etc.). It is stated as occurring between avatars herein for simplicity purposes. It should also be noted that the virtual universe server may delegate differing and progressive amounts of texture, object, and geometry transmission to peers depending on the server's present resource load. Furthermore, unlike traditional peer-to-peer transmission all peers are always transferring, at least some, information to or from the virtual universe server. Such a system permits embodiments to employ and improve upon traditional peer-to-peer models using source coding techniques with side information, such as Slepian-Wolf lossless compression or the Wuner-Ziv lossy compression algorithm depending on the desired or acceptable level of degradation. Such a system may be more efficient than the usual lossless or lossy compression algorithms employed in other peer-to-peer systems.

Note that some objects may be perpetually distributed via the peer-to-peer model model for pre-caching more static sections of the database such as textures (JPEG files), especially for those who are in the same region or building. In this embodiment, a list of object hashes may be distributed/replicated out by the server (or via peer-to-peer itself) to all the clients, and then the clients in peer-to-peer mode can commence with downloading from/uploading to each other. A peer-to-peer protocol such as Torrents would be an especially efficient distribution model. A modification to the standard Torrent architecture would include: downloading directly from the server when there are persistent timeouts to other clients, which may be the case when clients are behind firewalls or when such traffic is blocked by ISPs. Regardless, avatars 92A-N will continue to transmit low bandwidth data such as location information and movement information (e.g., among one another, to server, etc.)

III. Computerized Implementation

Figure 7:
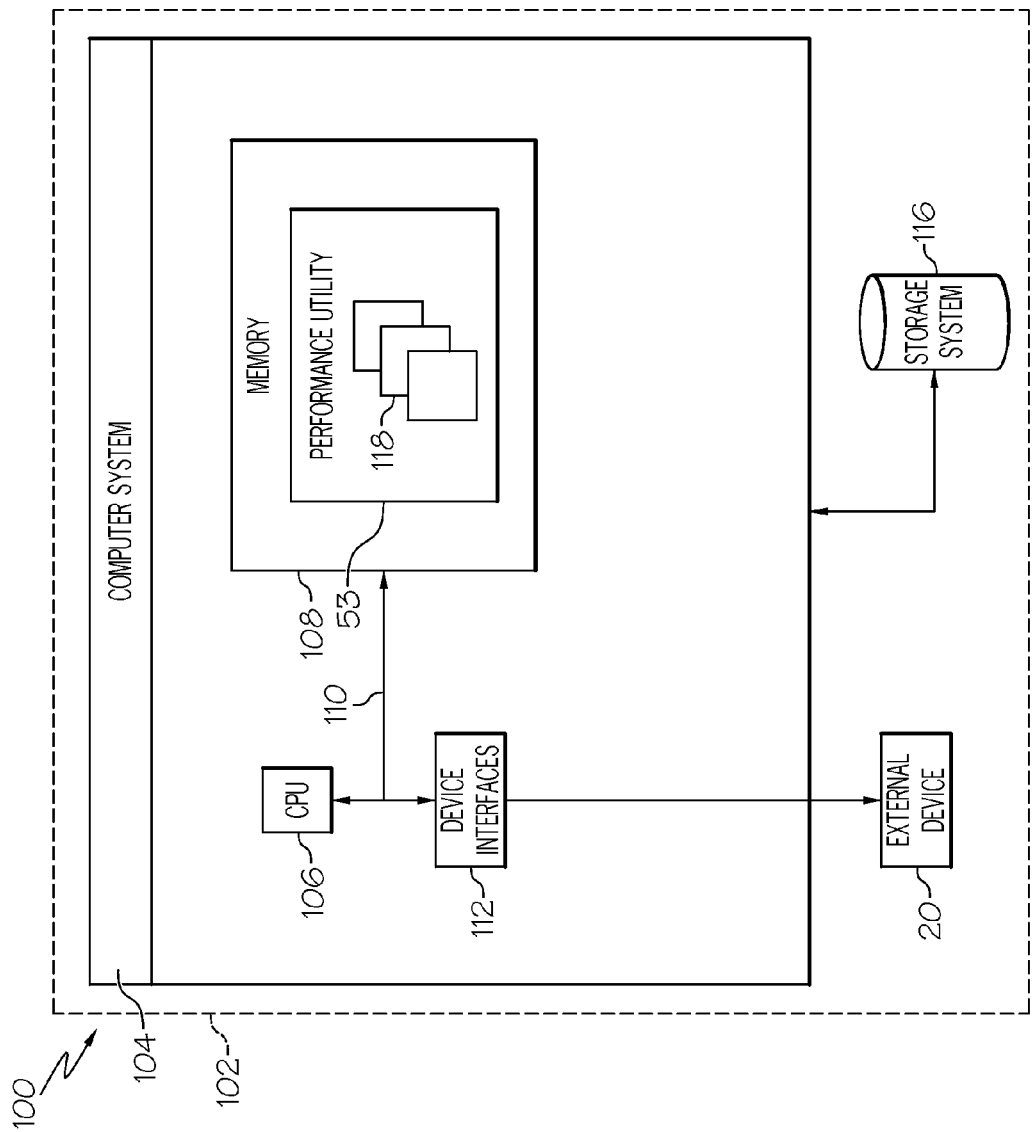
FIG. 7 shows computerized implementation according to one embodiment of the present invention.

Referring now to FIG. 7, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and device interfaces 112. Further, performance utility 53 is shown having external devices and storage system 116 that communicate with bus via device interfaces (although image capture device 20 alternatively could directly communicate with bus 110). In general, processing unit 106 executes computer program code, such as performance utility 53, which is stored in memory 108 and/or storage system 116. While executing computer program code, processing unit 106 can read and/or write data to/from memory 108, storage system 116, and/or device interfaces 112. Bus 110 provides a communication link between each of the components in performance utility 53. Although not shown, performance utility 53 could also include I/O interfaces that communicate with: one or more external devices such as a kiosk, a checkout station, a keyboard, a pointing device, a display, etc.); one or more devices that enable a user to interact with performance utility 53; and/or any devices (e.g., network card, modem, etc.) that enable performance utility 53 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, performance utility 53 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 7 can be included in performance utility 53.

Storage system 116 can be any type of system capable of providing storage for information under the present invention such as item appearances. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into performance utility 53.

Figure 8:
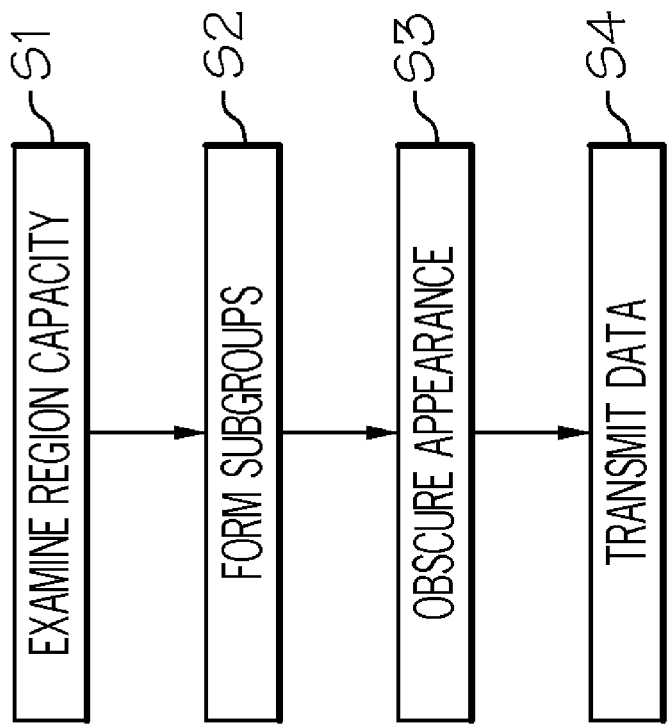
FIG. 8 shows a flow diagram of a method according to one embodiment of the invention.

Shown in memory 108 of performance utility 53 is performance utility 53, with a set of modules 118. The modules 118 correspond to those shown in FIG. 5 for performance utility 53. They have been shown in group format 118 in FIG. 7 to demonstrate that the configuration of FIG. 5 need not be limiting and the same functionality could be accomplished in any quantity and/or configuration of modules. Still yet, set of modules 118 provides the functions of the present invention as described herein. Such functionality will be illustrated using method flow diagram of FIG. 8.

As shown in step S1, a capacity of the region of the VU IS examined to determine whether the capacity exceeds a predetermined threshold. In step S2, a set of subgroups of avatars is formed in the region if the predetermined threshold is exceeded. In step S3, an appearance of at least one avatar outside of the particular one of the set of subgroups in the region is obscured to the avatars in the subgroup. In step S4, VU data is transmitted between the avatars of a particular one of the set of subgroups using a peer-to-peer broadcast.

While shown and described herein as a solution for enhancing performance in a VU, it is understood that the invention further provides various alternative embodiments. For example, in one embodiment, the invention provides a computer-readable/useable medium that includes computer program code to enable a computer infrastructure to provide performance of items in a VU. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 7) and/or storage system 116 (FIG. 7) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide enhanced performance in a VU. In this case, the service provider can create, maintain, support, etc., a computer infrastructure, such as computer infrastructure 102 (FIG. 7) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for enhancing performance in a VU. In this case, a computer infrastructure, such as computer infrastructure 102 (FIG. 7), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as performance utility 53 (FIG. 7), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing a program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for content delivery in a region of a virtual universe (VU), comprising:
    detecting a plurality of interactions among avatars;
    tracking the detected plurality of interactions;
        examining a load capacity of a server supporting the region of the VU to determine whether the load capacity exceeds a predetermined load threshold;
        forming a set of subgroups of avatars in the region if the predetermined load threshold is exceeded, each of the set of subgroups containing one or more avatars for which the detecting and tracking is performed; and
        responsive to the predetermined load threshold being exceeded, if an amount of VU data being transferred to or from the server exceeds a pre-determined bandwidth threshold, transmitting at least some of the amount of VU data between the avatars of a particular one of the set of subgroups using a peer-to-peer broadcast, wherein all of the avatars in the particular one of the set of subgroups are transferring at least some VU data to or from the server, and wherein if the amount of VU data is below the pre-determined bandwidth threshold, not transmitting the amount of VU data between the avatars of the particular one of the set of subgroups.

2. The method of claim 1, further comprising obscuring an appearance of at least one avatar outside of the particular one of the set of subgroups in the region to the avatars in the subgroup.

3. The method of claim 1, the capacity being determined to exceed the predetermined threshold based on the load on the server supporting the VU.

4. The method of claim 1, the VU data transmitted between the avatars of the particular one of the set of subgroups being high bandwidth geometries and textures.

5. The method of claim 1, further comprising transmitting low bandwidth data between the avatars of different subgroups.

6. The method of claim 5, the low bandwidth data being location information and movement information.

7. The method of claim 5, the low bandwidth data being transmitted to the server supporting the VU.

8. A computer-implemented system for content delivery in a region of a virtual universe (VU), comprising:
    a bus;
    a processor coupled to the bus; and
        a memory medium coupled to the bus, the memory medium comprising instructions to:
    detect a plurality of interactions among avatars;
    track the detected plurality of interactions;
        examine a load capacity of a server supporting the region of the VU to determine whether the load capacity exceeds a predetermined load threshold;
        form a set of subgroups of avatars in the region if the predetermined load threshold is exceeded, each of the set of subgroups containing one or more avatars for which the detecting and tracking is performed; and
        responsive to the predetermined load threshold being exceeded, if an amount of VU data being transferred to or from the server exceeds a pre-determined bandwidth threshold, transmit at least some of the amount of VU data between the avatars of a particular one of the set of subgroups using a peer-to-peer broadcast, wherein all of the avatars in the particular one of the set of subgroups are transferring at least some VU data to or from the server, and wherein if the amount of VU data is below the pre-determined bandwidth threshold, not transmitting the amount of VU data between the avatars of the particular one of the set of subgroups.

9. The system of claim 8, the memory medium further comprising instructions to obscure an appearance of at least one avatar outside of the particular one of the set of subgroups in the region to the avatars in the subgroup.

10. The system of claim 8, the capacity being determined to exceed the predetermined threshold based on the load on the server supporting the VU.

11. The system of claim 8, the VU data transmitted between the avatars of the particular one of the set of subgroups being high bandwidth geometries and textures.

12. The system of claim 8, the memory medium further comprising instructions to transmit low bandwidth data between the avatars of different subgroups.

13. The system of claim 12, the low bandwidth data being location information and movement information.

14. The system of claim 13, the low bandwidth data being transmitted to the server supporting the VU.

15. A program product stored on a computer readable storage device for content delivery in a region of a virtual universe (VU), the computer readable storage device containing program code for causing a computer to:
    detect a plurality of interactions among avatars;
    track the detected plurality of interactions;
        examine a load capacity of a server supporting the region of the VU to determine whether the load capacity exceeds a predetermined load threshold;
        form a set of subgroups of avatars in the region if the predetermined load threshold is exceeded, each of the set of subgroups containing one or more avatars for which the detecting and tracking is performed; and
        responsive to the predetermined load threshold being exceeded, if an amount of VU data being transferred to or from the server exceeds a pre-determined bandwidth threshold, transmit at least some of the amount of VU data between the avatars of a particular one of the set of subgroups using a peer-to-peer broadcast, wherein all of the avatars in the particular one of the set of subgroups are transferring at least some VU data to or from the server, and wherein if the amount of VU data is below the pre-determined bandwidth threshold, not transmitting the amount of VU data between the avatars of the particular one of the set of subgroups.

16. The program product stored on the computer readable storage device of claim 15, the computer readable storage device further containing program code for causing the computer to: obscure an appearance of at least one avatar outside of the particular one of the set of subgroups in the region to the avatars in the subgroup.

17. The program product stored on the computer readable storage device of claim 15, the capacity being determined to exceed the predetermined threshold based on the load on the server supporting the VU.

18. The program product stored on the computer readable storage device of claim 15, the VU data transmitted between the avatars of the particular one of the set of subgroups being high bandwidth geometries and textures.

19. The program product stored on the computer readable storage device of claim 15, the computer readable storage device further containing program code for causing the computer to: transmit low bandwidth data between the avatars of different subgroups.

20. The program product stored on the computer readable storage device of claim 19, the low bandwidth data being location information and movement information.

21. The program product stored on the computer readable storage device of claim 20, the low bandwidth data being transmitted to the server supporting the VU.

22. A method for content delivery in a region of a virtual universe (VU), comprising:
providing a computer infrastructure being operable to:
detect a plurality of interactions among avatars;
track the detected plurality of interactions;
examine a capacity of a server supporting the region of the VU to determine whether the load capacity exceeds a predetermined load threshold;
form a set of subgroups of avatars in the region if the predetermined load threshold is exceeded, each of the set of subgroups containing one or more avatars for which the detecting and tracking is performed; and
responsive to the predetermined load threshold being exceeded, if an amount of VU data being transferred to or from the server exceeds a pre-determined bandwidth threshold, transmit at least some of the amount of VU data between the avatars of a particular one of the set of subgroups using a peer-to-peer broadcast, wherein all of the avatars in the particular one of the set of subgroups are transferring at least some VU data to or from the server, and wherein if the amount of VU data is below the pre-determined bandwidth threshold, not transmitting the amount of VU data between the avatars of the particular one of the set of subgroups.

23. The method of claim 22, the computer infrastructure being further operable to obscure an appearance of at least one avatar outside of the particular one of the set of subgroups in the region to the avatars in the subgroup.

* * * * *